United States Patent [19]
Hofmann et al.

[11] Patent Number: 5,560,593
[45] Date of Patent: Oct. 1, 1996

[54] ELASTIC BEARING BUSH

[75] Inventors: Manfred Hofmann, Hünfelden; Robert Salz, Neustadt, both of Germany

[73] Assignee: Metzeler Gimetall AG, Munich, Germany

[21] Appl. No.: 520,957

[22] Filed: Aug. 30, 1995

Related U.S. Application Data

[63] Continuation of Ser. No. 208,979, Mar. 10, 1994, abandoned.

[30] Foreign Application Priority Data

Mar. 10, 1993 [DE] Germany .......................... 43 07 559.2

[51] Int. Cl.$^6$ ........................................................ F16M 5/00
[52] U.S. Cl. ........................... 267/219; 267/140.12
[58] Field of Search ............................ 267/35, 292, 293, 267/140.12, 140.2, 152, 153, 219, 220; 248/562, 636, 638

[56] References Cited

U.S. PATENT DOCUMENTS

| | | | |
|---|---|---|---|
| 4,157,227 | 6/1979 | Hahle | 267/293 X |
| 4,790,520 | 12/1988 | Tanaka et al. | 267/152 |
| 4,848,756 | 7/1989 | Funahashi et al. | 267/293 X |
| 4,871,152 | 10/1989 | Funahashi | 267/140.12 |
| 5,050,850 | 9/1991 | Noguchi et al. | 267/140.12 |
| 5,156,379 | 10/1992 | Tabata | 267/140.12 |

*Primary Examiner*—Lee Young
*Attorney, Agent, or Firm*—Herbert L. Lerner; Laurence A. Greenberg

[57] ABSTRACT

An elastic bearing bush includes an outer, cylindrical bearing sleeve having an interior, an inner part, and a horizontally extending elastomer body holding the inner part in the interior. The elastomer body defines free regions in the form of circular segments acting as upper and lower fluid-filled spring deflection chambers above and below the inner part. Elastic, substantially cup-shaped stops are fixed on the bearing sleeve, are disposed inside the spring deflection chambers, protrude to the vicinity of the inner part and enclose the spring deflection chambers between the stops and the bearing sleeve. The spring deflection chambers communicate with one another through conduits.

7 Claims, 2 Drawing Sheets

ELASTIC BEARING BUSH

This application is a continuation of application Ser. No. 08/208,979, filed Mar. 10, 1994, now abandoned.

BACKGROUND OF THE INVENTION

Field of the Invention

The invention relates to an elastic bearing bush having an outer, cylindrical bearing sleeve and an inner part held in the interior by a horizontally extending elastomer body, the elastomer body has free regions in the form of circular segments as spring deflection chambers above and below the inner part.

One such elastic bearing bush is known from German Patent DE 27 55 117 C2. There, additional stops are provided on the top or also on the bottom, of the inner part. On one hand they limit the spring deflection travel of the inner part and on the other hand they also effect prestressing. However, such bearing bushes exhibit only slight damping since the stops strike the bearing sleeve relatively hard.

SUMMARY OF THE INVENTION

It is accordingly an object of the invention to provide an elastic bearing bush, which overcomes the hereinafore-mentioned disadvantages of the heretofore-known devices of this general type and which additionally brings about damping of incident vibration at greater amplitudes.

With the foregoing and other objects in view there is provided, in accordance with the invention, an elastic bearing bush, comprising an outer, cylindrical bearing sleeve having an interior; an inner part; a horizontally extending elastomer body holding the inner part in the interior, the elastomer body defining free regions in the form of circular segments acting as upper and lower fluid-filled spring deflection chambers above and below the inner part; elastic, substantially cup-shaped stops being fixed on the bearing sleeve, being disposed inside the spring deflection chambers, protruding to the vicinity of the inner part and enclosing the spring deflection chambers between the stops and the bearing sleeve; and conduits through which the spring deflection chambers communicate with one another.

With such a structure, the inner part will come into contact with the cup-shaped stops only upon relatively major vibration amplitudes, and then upon compression of these stops it will undergo damping by the fluid that is positively displaced in delayed fashion.

In accordance with another feature of the invention, the cup-shaped stops have a stop cushion being located on the inside, having an approximately parallelepiped shape, and ending some distance before the bearing sleeve, in order to limit the total travel.

In accordance with a further feature of the invention, the fluid conduits extend centrally to the longitudinal axis of the bush in the form of circumferential conduits along the inside periphery of the bearing sleeve.

In accordance with an added feature of the invention, the inner part is constructed with a virtually rectangular cross section and a central bore.

In accordance with an additional feature of the invention, there is provided a gap between the underside of the cup-shaped stops and the elastomer body supporting the inner part which widens in wedge-like fashion in the transverse direction toward the outside, for the sake of meeting the stop progressively.

In accordance with yet another feature of the invention, there are provided caps of plastic tapering in wedge-like fashion longitudinally and being inserted into the gap between the cup-shaped stops and the inner part, in order to achieve prestressing of the bearing.

In accordance with a concomitant feature of the invention, for the sake of greater prestressing, the inner part has dovetail-like grooves extending longitudinally on the top and/or the bottom, into which stop bodies spanning the gaps toward the stop are inserted.

Other features which are considered as characteristic for the invention are set forth in the appended claims.

Although the invention is illustrated and described herein as embodied in an elastic bearing bush, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
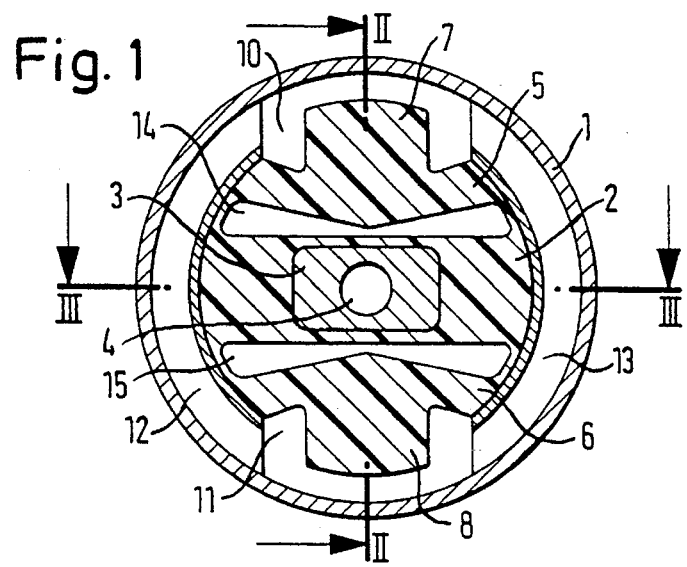
FIG. 1 is a diagrammatic, central cross-sectional view of a bearing bush.
Figure 2:
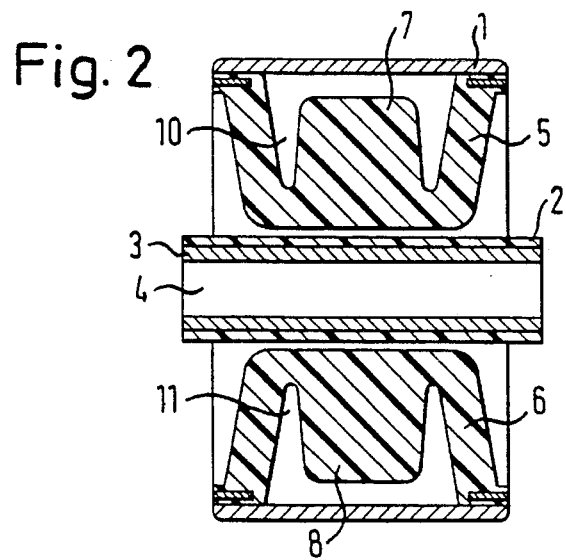
FIG. 2 is a longitudinal-sectional view of the bush which is taken along a line II—II of FIG. 1, in the direction of the arrows.
Figure 3:
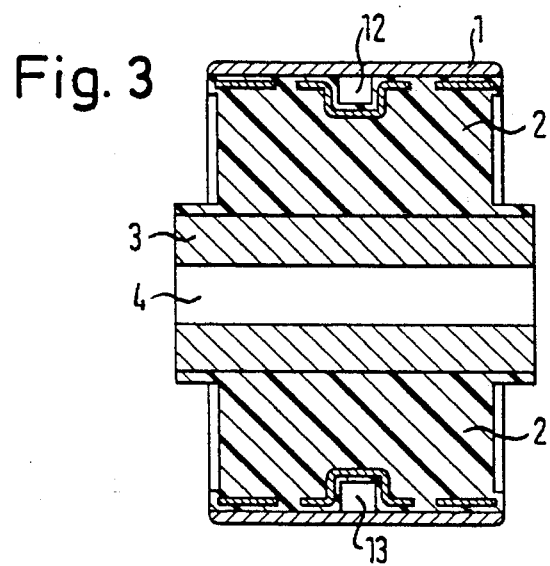
FIG. 3 is a horizontal-sectional view of the bush which is taken along a line III—III of FIG. 1, in the direction of the arrows.

Referring now to the figures of the drawing in detail and first, particularly, to FIGS. 1–3 thereof, there is seen a bearing bush which has a cylindrical bearing sleeve or cage 1, in which a virtually rectangularly constructed inner part 3 of plastic or metal with a central bore 4 is retained by a horizontally extending elastomer body 2.

In free regions above and below this elastomer body 2, virtually cup-shaped stops 5 and 6 of an elastomer material are fixed to the outer bearing sleeve 1 and protrude into the vicinity of the inner part 3. These stops 5, 6 each have a respective virtually parallelepiped stop cushion 7 and 8 being located on the inside and ending some distance before of the bearing sleeve 1.

As a result of the shape of the stops 5 and 6, fluid-filled chambers 10 and 11 are enclosed between them and the bearing sleeve 1. These chambers communicate with one another through conduits 12 and 13 extending along the circumference of the bearing sleeve 1.

As can also be seen from FIG. 1, gaps 14 and 15 are widened in wedge-like fashion transversely toward the outside between the elastomer body 2 and the stops 5 and 6, so as to assure a progressive performance of the stops.

If a vibration of relatively greater amplitude is then introduced into the bearing bush, which results in a shift in position of the inner part 3 and the outer part 1 relative to one another, the inner part 3 after a certain free travel will come into contact with the inwardly protruding regions of the cup-shaped stops 5 or 6 and after a further vertical displacement will force fluid out of the chamber 10 or 11, depending on the displacement direction, into the other respectively chamber 11 or 10 through the conduits 12 and 13 and thus effect damping of the incident vibration. If the stops are very large, they are then defined by the impact of the stop cushions 7 or 8 on the bearing sleeve 1.

As can be seen from the above description and the drawing, vibrations of low amplitude are conversely not damped, as long as they do not exceed the free travel defined by the gaps 14 and 15.

In bearing bushes constructed in this way, the possibility also exists of installing these bushes with prestressing.

Figure 4:
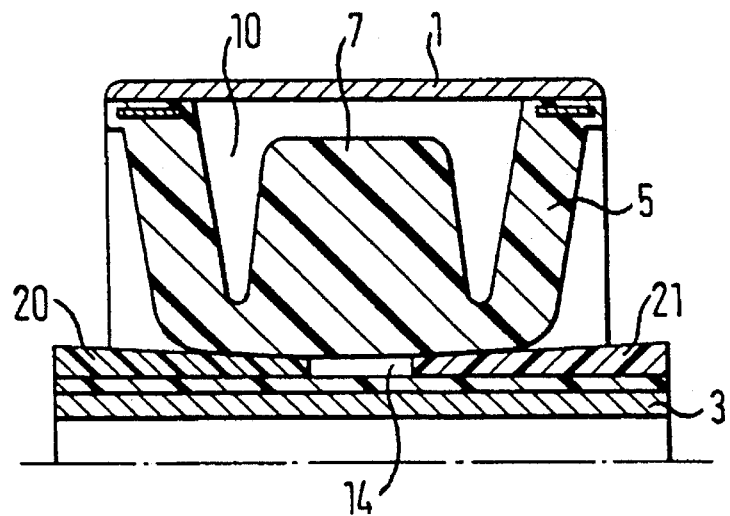
FIG. 4 is a longitudinal-sectional view of the bearing bush with wedge-shaped prestressing elements.

As can be seen from FIG. 4, caps 20 and 21 of plastic that taper in wedge-like fashion may be pressed into the gap 14 between the cup-shaped stop 5 and the inner part 3, and can thus effect the corresponding prestressing.

Figure 5:
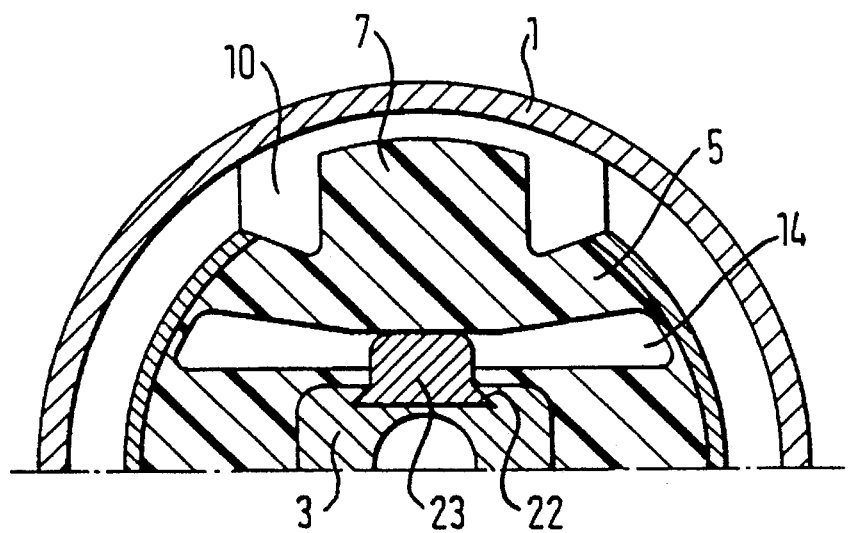
FIG. 5 is a cross-sectional view of the bearing bush with prestressing elements inserted into dovetail-shaped retainers.

Another option for bringing about prestressing is shown in the cross section of FIG. 5. In this case, a dovetail-like groove 22 is cut longitudinally into the top of the inner part 3, and a suitably shaped stop body 23 is inserted into it. Once again, this stop body spans the gap 14 between the upper part 3 and the cup-shaped stop 5 and optionally enlarges it accordingly.

Both prestressing provisions as shown in FIGS. 4 and 5 may also be used in the same way on the underside of the inner part 3.

The overall outcome is accordingly a bearing bush with hydraulic stops, in which vibration of great amplitude is damped by displacement of fluid, and low amplitudes of high frequency within a predeterminable free travel are not damped.

We claim:

1. An elastic bearing bush, comprising:

an outer, cylindrical bearing sleeve having an interior;

an inner part, said inner part having a central bore formed therein;

a horizontally extending elastomer body having a central portion holding said inner part, said elastomer body having a longitudinal axis and defining free regions in the form of circular segments disposed between said bearing sleeve and said inner part and acting as upper and lower fluid-filled spring deflection chambers above and below said inner part;

said elastomer body further having elastic, substantially cup-shaped stops being fixed on said bearing sleeve, being disposed inside said upper and lower fluid-filled spring deflection chambers, protruding to the vicinity of said inner part and enclosing said spring deflection chambers between said stops and said bearing sleeve; and conduits through which said spring deflection chambers communicate with one another;

said central portion of said elastomer body being defined by gaps extending transversely to the longitudinal axis of said elastomer body and substantially across an entire width of said cup-shaped stops, said gaps widening in a wedge shape outwardly in a transverse direction; said gaps distancing said central portion of said elastomer body holding said inner part from said cup-shaped stops and forming a free travel path preventing contact between the central portion of said elastomer body and said stops in the case of vibrations of a relatively small amplitude.

2. The elastic bearing bush according to claim 1, wherein said stops each have a stop cushion being disposed on the inside, having an approximately parallelepiped shape, and ending at a distance from said bearing sleeve.

3. The elastic bearing bush according to claim 1, wherein said bearing sleeve has an inner periphery, and said conduits extend centrally relative to a longitudinal axis of the bearing bush in the form of circumferential conduits disposed along said inner periphery.

4. The elastic bearing bush according to claim 1, wherein said inner part has a substantially rectangular cross section and a central bore formed therein.

5. The elastic bearing bush according to claim 4, wherein said stops have lower surfaces defining said gaps between said lower surfaces and said central portion of said elastomer body.

6. An elastic bearing bush, comprising:

an outer, cylindrical bearing sleeve having an interior;

an inner part;

a horizontally extending elastomer body holding said inner part in said interior, said elastomer body defining free regions in the form of circular segments acting as upper and lower fluid-filled spring deflection chambers above and below said inner part;

elastic, substantially cup-shaped stops being fixed on said bearing sleeve, being disposed inside said spring deflection chambers, protruding to the vicinity of said inner part and enclosing said spring deflection chambers between said stops and said bearing sleeve;

conduits through which said spring deflection chambers communicate with one another;

wherein said inner part has a substantially rectangular cross section and a central bore formed therein, said stops have lower surfaces defining gaps between said lower surfaces and said elastomer body, and said gaps are widened in a wedge shape in a transverse direction toward the outside; and plastic caps being inserted into said gaps between said stops and said inner part and being tapered in a wedge shape longitudinally, for prestressing the bearing bush.

7. An elastic bearing bush, comprising:

an outer, cylindrical bearing sleeve having an interior;

an inner part;

a horizontally extending elastomer body holding said inner part in said interior, said elastomer body defining free regions in the form of circular segments acting as upper and lower fluid-filled spring deflection chambers above and below said inner part;

elastic, substantially cup-shaped stops being fixed on said bearing sleeve, being disposed inside said spring deflection chambers, protruding to the vicinity of said inner part and enclosing said spring deflection chambers between said stops and said bearing sleeve;

conduits through which said spring deflection chambers communicate with one another;

wherein said inner part has a substantially rectangular cross section and a central bore formed therein, said stops have lower surfaces defining gaps between said lower surfaces and said elastomer body, and said gaps are widened in a wedge shape in a transverse direction toward the outside; and wherein said inner part has top and bottom surfaces and dovetail-like grooves extending longitudinally in at least one of said surfaces, and including stop bodies being inserted into said grooves and spanning said gaps toward said stop, for producing prestressing of the bearing bush.

* * * * *